Dec. 16, 1952 — G. A. LYON — 2,621,825
COOKING VESSEL
Filed Feb. 7, 1950 — 2 SHEETS—SHEET 2
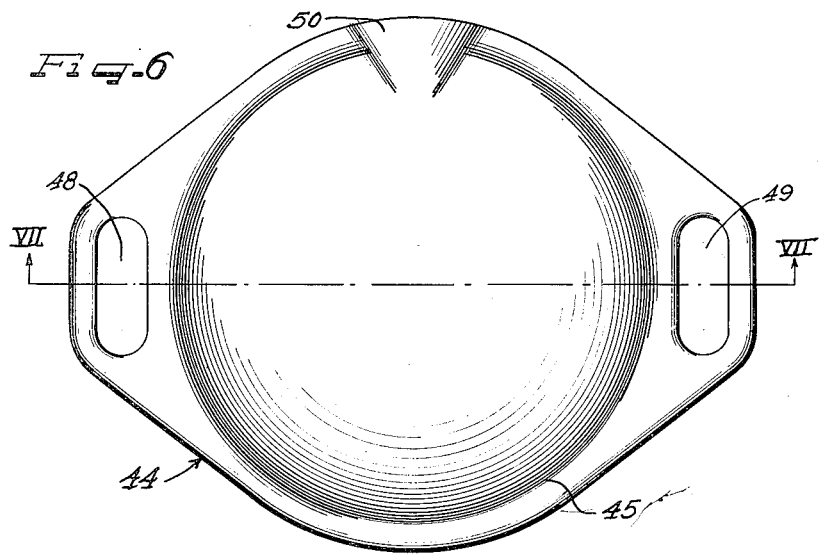
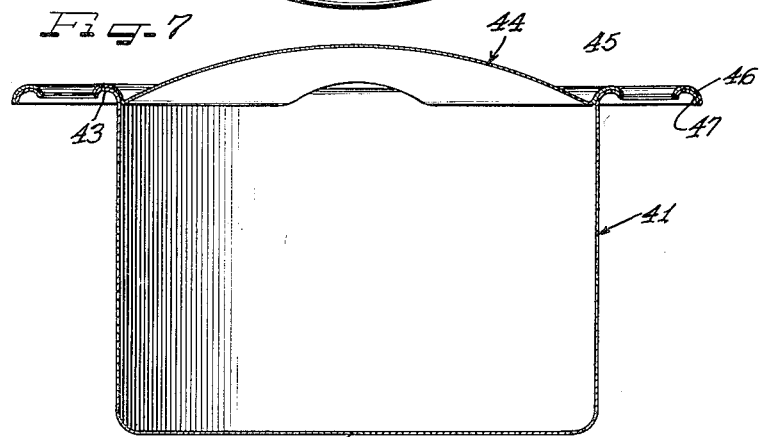
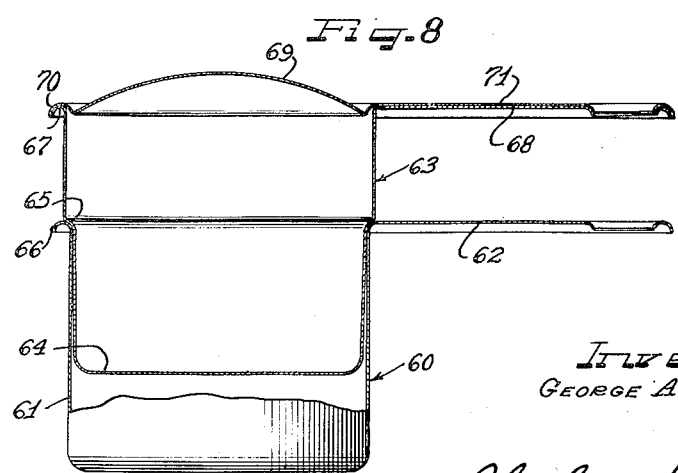
Inventor
GEORGE ALBERT LYON
by The Firm of Charles W. Hills Attys.

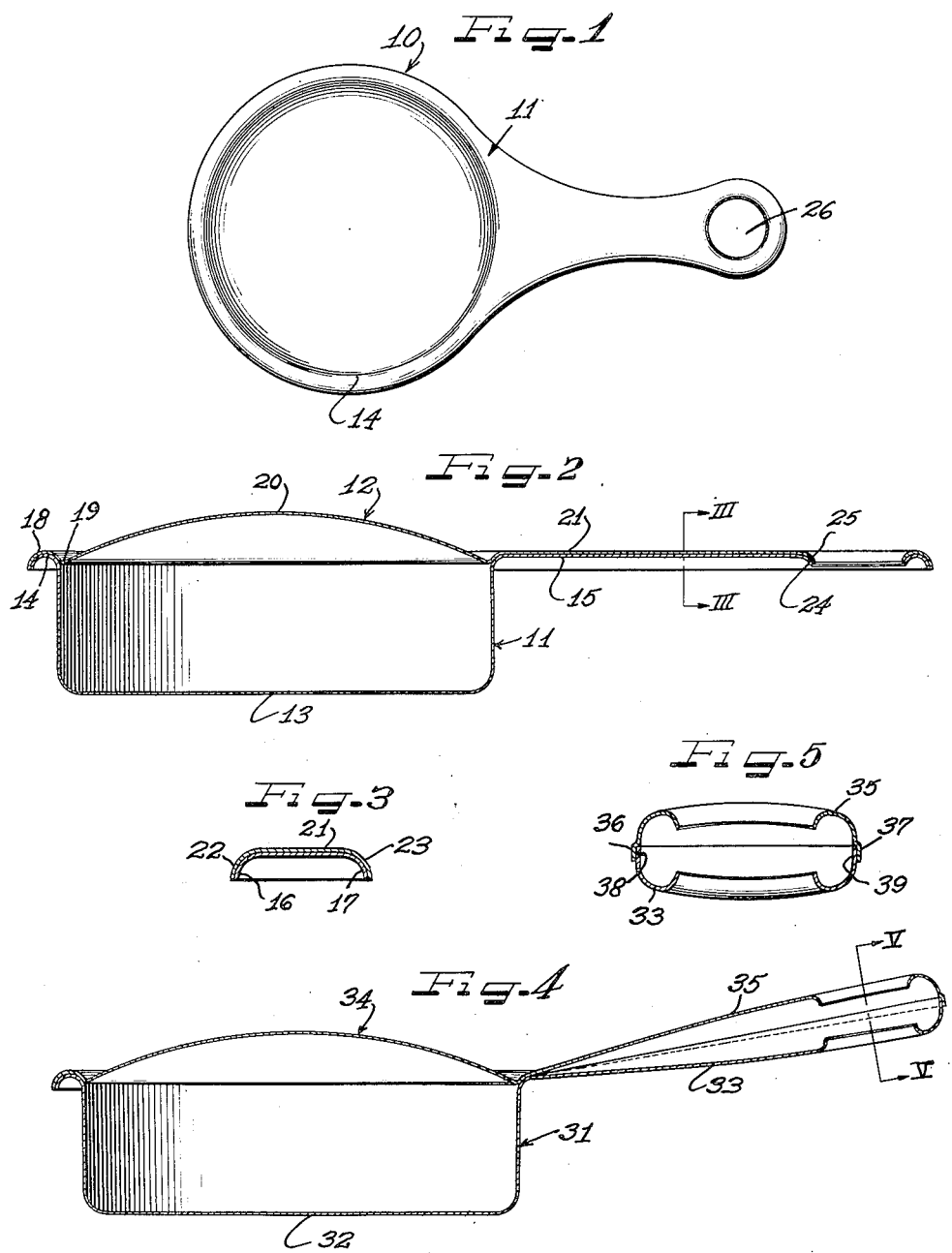

Patented Dec. 16, 1952

2,621,825

UNITED STATES PATENT OFFICE 2,621,825

COOKING VESSEL

George Albert Lyon, Detroit, Mich.

Application February 7, 1950, Serial No. 142,902

2 Claims. (Cl. 220—24)

1

This invention relates to improved cooking vessels, of a type which are conveniently manufactured, easy to clean, and very convenient in use.

The cooking utensils, such as pots, skillets, saucepans, double boilers, and the like, in common use, ordinarily consist of a receptacle portion having a handle united thereto by means of rivets or welding, and a separate cover member for closing the receptacle portion. Such cooking utensils are subject to several disadvantages, among them being the fact that a perfect union between the handle and the receptacle member is difficult to obtain. If the two members are imperfectly joined, void spaces are produced which serve as condensation points for moisture and steam, thereby increasing the rate of corrosion of the metal surfaces. Such welded or riveted unions are difficult, if not impossible, to clean so that this condition is not easily correctable.

Another disadvantage of commonly used cooking utensils lies in the fact that both hands of the cook are required to manipulate the vessel when it is desired to drain fluid from the contents of the receptacle. Then, too, there is always the possibility of the cover slipping from the grasp of the cook as the fluid is being poured off, which could very easily result in scalding the operator's hand by the steam emanating from the receptacle.

The disadvantages attendant to the use of the commonly used types of cooking utensils have been eliminated in the present invention by providing the cooking utensils with handle portions which are integral with the receptacle portions, thereby greatly simplifying the problem of cleaning the vessel, and by providing a cover member for such utensils in loose fitting engagement with the integral handle of the receptacle member so that the vessel may be drained of its fluid contents by merely grasping the mating handles in one hand and tilting the utensil to allow fluid to drain off between the receptacle and the cover member.

Another of the features of the present invention resides in the use of metal stampings for the receptacle and cover members of the cooking utensils, thus obviating the necessity of providing welding or riveted unions between the components of the utensils.

With the foregoing in mind, an object of the present invention is to provide cooking utensils which are easy to clean and durable.

Another object of the present invention is to provide cooking utensils, such as pans, pots, skillets, boilers, and the like, wherein the cover members and the receptacle members are so interrelated that the utensil may be drained solely by the use of one hand.

Still another object of the present invention is

2 to provide a cooking utensil which is attractive in appearance, and economical to manufacture.

Other objects and features of the present invention will be apparent to those skilled in the art from the following description of the attached sheets of drawings, in which:

Figure 1 is a plan view of a skillet having the novel features of the present invention;

Figure 2 is a cross-sectional view, with parts in elevation, taken along the longitudinal center line of the assembly shown in Figure 1;

Figure 3 is a cross-sectional view taken along the line III—III of Figure 2;

Figure 4 is a cross-sectional view in elevation of a modified form of skillet;

Figure 5 is a cross-sectional view taken along the line V—V of Figure 4;

Figure 6 is a plan view of a pot construction having the features of the present invention;

Figure 7 is a cross-sectional view, with parts in elevation, taken along the line VII—VII of Figure 6; and Figure 8 is a view in elevation, with portions thereof broken away, of a double boiler assembly embodying several of the features of the present invention.

As shown on the drawings:

In Figures 1 to 5, there is illustrated a skillet construction embodying the novel elements of construction of the utensils of the present invention. The skillet construction is to be taken as typical of other cooking utensils, such as saucepans, and the like.

In Figures 1 to 3, reference numeral 10 denotes generally the complete skillet, consisting of a body member 11 and a cover member 12 in relatively loose fitting engagement therewith, as will be hereinafter explained. The body member 11 has a receptacle portion 13 formed therein to receive the material to be cooked. The receptacle portion 13 has a downwardly rolled marginal edge 14 extending about a major portion of its periphery, and an integral handle portion 15 extending from a section of its periphery. The handle portion 15 is also provided with downwardly turned marginal edges 16 and 17.

The cover member 12 has a similar downwardly turned marginal edge 18 arranged to overlie the marginal edge 14 of the receptacle in loose fitting, nesting relationship therewith. The cover member 12 is also provided with an annular bead 19 which engages a wall surface of the receptacle 13. The central portion of the handle 12 is bowed as at 20.

For the purpose of engaging the cover 12 with the body member 11 so that the complete assembly may be manipulated more readily, the cover member 12 is provided with an integral handle 21 having its marginal edges downwardly turned as at 22 and 23 in overlying relationship to the marginal edges 16 and 17 of the body member 11. This construction is more clearly illustrated in Figures 2 and 3.

The handle portion of the body member 11 is provided with an aperture near the extreme end thereof formed by punching out a section of the handle portion 15 to leave a downwardly turned lip 24. Similarly, an area of the handle portion 21 of the cover 12 is provided with an aperture in registry with the aperture formed in the underlying handle member 15, leaving a downwardly turned lip 25. The registering apertures thus provide an aperture 26 in the handle portion of the utensil for conveniently hanging the utensil when not in use.

The embodiment shown in Figures 4 and 5 is similar to that of Figures 1 to 3, and includes a body member 31 having a recessed receptacle portion 32 and is provided with an integral handle portion 33 which extends upwardly from the body member 31 at a slight angle. A cover member 34 is engaged with the receptacle portion 32 similarly to the manner described in connection with the embodiment shown in Figures 1 to 3, and also has an upwardly extending handle portion 35 integral therewith. The handle 35 is detachably engaged with the handle 33 of the body member 31 by providing offset marginal flange portions 36 and 37 at both marginal edges thereof, the flange portions 36 and 37 snugly containing the marginal edges 38 and 39 of the handle portion 31.

From the above description, it will be evident that the skillet constructions shown in Figures 1 to 5 have advantages over the skillets now in common use. The integral structure of the body members and their handles make cleaning of the utensil much more convenient. In addition, the engagement of the cover members with their respective body portions is such that the utensil can be manipulated easily with one hand where the fluid contents are desired to be periodically drained from the receptacle.

In Figures 6 and 7, there is illustrated a pot structure provided with a cover member. This structure includes a body member 41 having a receptacle portion 42. The outer periphery of the receptacle portion 42 is formed into an outwardly extending flange portion 43 which serves as the handle portion for the body member 41.

A centrally bowed cover member 44 has an annular bead 45 thereon in engagement with the inner wall of the receptacle portion 42 and has a downwardly turned peripheral edge 46 which nests with a similarly turned marginal edge 47 on the body member 41. The body member 41 and the cover member 44 are both struck out to form a pair of apertures 48 and 49 to facilitate grasping the body member 41 with the cover member 44 attached thereto. The cover member 44 is also provided with a lip 50 which serves as a pouring spout for the pot assembly.

In Figure 8, there is illustrated a double boiler construction which includes a lower boiler 60 having a receptacle portion 61 for receiving water, and an integral handle portion 62 extending therefrom. A second boiler 63 having a receptacle portion 64 is provided with a crimped portion 65 to engage the rolled peripheral edge 66 of the first boiler 60, as is commonly done in boilers of this type.

The second boiler 63 has a downwardly turned peripheral edge 67 and an integral handle portion 68 extending therefrom. A cover member 69 having a downwardly turned marginal edge 70 in loose fitting nesting engagement with the downwardly turned edge 67 is also provided with an integral handle 71 which nests with the handle 68 in the same manner as the previously described embodiments.

It will be appreciated that the cover member 69 is suitably dimensioned so that it may be used in conjunction with the first boiler 60 as a saucepan cover, if so desired.

From the foregoing, it will be appreciated that I have provided a novel type of structure for cooking utensils in which the cleaning of the utensils is facilitated and manipulation of the utensil is simplified by enabling the cook to grasp the utensil and cover through the use of only one hand. In addition, the component parts of the utensil may be fabricated from ordinary sheet metal stampings, thus providing a utensil of relatively low cost and one which is conveniently manufactured.

It will be understood that modifications and variations may be effected without departing from the scope of the novel concepts of the present invention.

I claim as my invention:

1. A cooking utensil assembly comprising complementally shaped vessel, cover and handle members, the handle members being integrally formed with their respective vessel and cover members, and having a laterally flared portion at the line of juncture with said respective other members, all of said members including a centrally disposed recessed portion, the peripheral portions of all of said members being arcuate in cross section and interfitting throughout their area of engagement to provide a continuous closed edge about said assembly.

2. A cooking utensil assembly comprising complementally shaped vessel, cover and handle members, the handle members being integrally formed with their respective vessel and cover members, and having a laterally flared portion at the line of juncture with said respective other members, all of said members including a centrally recessed portion, and a peripheral portion of arcuate cross section, and the recessed portion and the peripheral portion of one of said handle members being reversely formed from the other and having offset marginal flange portions to receive the arcuate peripheral edge portion of said other handle member to provide a hollow handle for said cooking utensil assembly, the peripheral portions of all of said members interfitting throughout their area of engagement to provide a closed edge about said assembly.

GEORGE ALBERT LYON.

REFERENCES CITED

The following references are of record in the file of this patent:

UNITED STATES PATENTS

| Number | Name | Date |
|---|---|---|
| 184,282 | Edgar et al. | Nov. 14, 1876 |
| 216,346 | Read | June 10, 1879 |
| 1,014,342 | Smith et al. | Jan. 9, 1912 |
| 1,187,721 | Edwards | June 20, 1916 |
| 1,212,833 | Stackhouse | Jan. 16, 1917 |
| 1,241,010 | Paquette | Sept. 25, 1917 |
| 2,011,752 | Christman | Aug. 20, 1935 |
| 2,473,964 | Moore | June 21, 1949 |

FOREIGN PATENTS

| Number | Country | Date |
|---|---|---|
| 402,150 | Great Britain | Mar. 30, 1933 |